H. DOLLMAN.
MEANS FOR LOCKING NUTS ON BOLTS OR THE LIKE.
APPLICATION FILED DEC. 31, 1914.

1,188,916.

Patented June 27, 1916.

WITNESSES:
John C. Sanders
Albert F. Heuman

INVENTOR:
Herbert Dollman
BY
ATTY.

COLUMBIA PLANOGRAPH CO., WASHINGTON, D. C.

UNITED STATES PATENT OFFICE.

HUBERT DOLLMAN, OF BIRMINGHAM, ENGLAND.

MEANS FOR LOCKING NUTS ON BOLTS OR THE LIKE.

1,188,916. Specification of Letters Patent. Patented June 27, 1916.

Application filed December 31, 1914. Serial No. 879,878.

*To all whom it may concern:*

Be it known that I, HUBERT DOLLMAN, retired mechanical engineer, a subject of His Majesty the King of Great Britain and Ireland, residing at Baskerville Place, Broad street, in the city of Birmingham, England, have invented certain new and useful Improvements in Means for Locking Nuts on Bolts and the like, of which the following is a specification.

This invention has reference to means for locking nuts on bolts and the like, my invention comprising a nut having one or more cross grooves in its top face tangential to and slightly intersecting the tapped hole in the nut in combination with one or more cross locking pegs engaging in such groove or grooves and also engaging with a cross groove or cross grooves in the bolt or stud, the nut being so constructed as to enable the locking peg or locking pegs to be effectually secured in position against the effects of vibration.

I will describe my invention by referring to the accompanying drawings of which—

Figure 1:
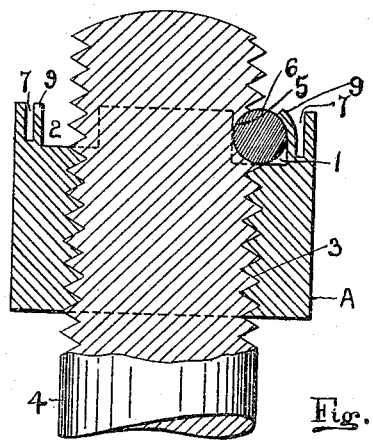
Figure 5:
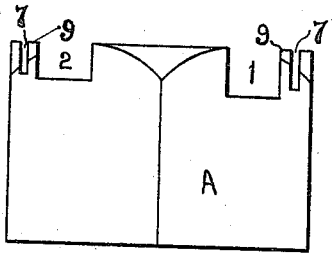
Figures 3, 4:
Figure 2:
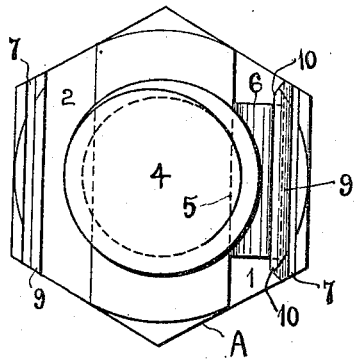
Figure 6:
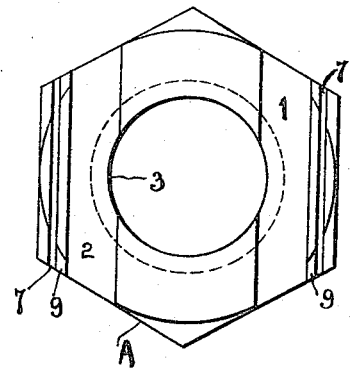
Figure 7:
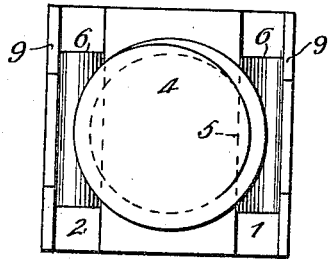

Figure 1 is a front sectional elevation of a lock nut constructed and locked in position on a bolt in accordance with this invention; Fig. 2 is a plan of the same; Fig. 3 is an end elevation of the locking pin of the same. Fig. 4 is a side elevation of the same locking pin; Fig. 5 is a front elevation of the lock nut alone, and Fig. 6 is a plan of the said lock nut. Fig. 7 is a plan of a modification of said lock nut.

A is the lock nut which according to my invention has two cross grooves marked respectively 1, 2 formed in its upper face tangential to and slightly intersecting the tapped hole 3 for the bolt 4 (or the nut may be formed with only one of these cross grooves) these cross grooves being in such positions that the periphery of the bolt 4 projects into them. After the nut has been screwed and tightened on to the bolt to the required position, a cross groove 5 is filed across the periphery of the bolt 4 so as to correspond with one of the cross grooves and into this a locking peg such as 6 (Figs. 3 and 4) is driven thereby engaging with both the groove 1 of the nut and the groove 5 of the bolt and effectually locking the nut in position on the bolt as in Figs. 1 and 2.

In order to prevent any possibility of the locking pin 6 getting out of position through vibrations, the outer wall 9 of each of the grooves 1, 2 is so formed as an up-standing tongue or tongues that it or they can readily be hammered down on to the side of the locking pin as in Figs. 1 and 2, and thus secure the locking pin in place. The formation of the side wall 9 of the groove into an upstanding tongue to enable it to be closed down as aforesaid is by means of a saw-cut 7 in the face of the nut at a short distance from and parallel with the face of the groove. The said locking pin 6 can be further secured by the extreme end portions 10 of the upstanding tongue 9 being bent around the ends of the locking pin 6 as shown in Fig. 2, thereby effectually preventing the locking pin 6 from moving endwise. When it is desired to unlock the nut this can be done by bending back the ends 10 of the tongue 9 and slightly bending up the tongue 9 itself so that the locking pin 6 can be driven out of the groove and thus unlock the nut. To enable these ends 10 of the tongue 9 to be bent around the ends of the locking pin 6 the locking pin is made somewhat shorter than the length of the tongue 9.

The object of making the lock nut with two grooves 1, 2 is that if at some time after the bolt has had the cross groove 5 formed in it to accommodate the locking pin as aforesaid, it should be desired to tighten up the nut the second groove in the nut will serve for the same groove 5 in the bolt after the nut has been revolved through half a turn and in order to facilitate this the second groove 2 is by preference made slightly shallower by an amount equal to half the pitch of the thread than the first groove 1 so that when the nut is turned through half a revolution as aforesaid the bottom of the second groove in the nut will be about level with the bottom of the groove 5 of the bolt, which would not be the case if both the grooves in the nut were made of the same depth.

The groove or grooves may either be parallel with the adjacent sides of the nut as shown in Figs. 1, 2, 5 and 6 or may be disposed in any other way with reference to the sides. Moreover if desired in order to facilitate the bending over of the tongue 9 the latter may by one or more cross cuts as shown in Fig. 7 be divided into shorter tongues which can be turned down independently of one another. Although for purposes of illustration I show a hexagonal nut constructed in accordance with my invention, it is equally applicable to other forms of nuts.

When the nut is tapped with a hole of the next larger size, as for instance a one inch nut tapped one inch and one eighth, so that the outer walls of the grooves are then so thin that the cutting of a saw-cut 7 such as shown in Figs. 5 and 6 would be impracticable, then no saw-cut 7 is formed in the nut as the side wall 9 will be thin enough to permit of its being closed down onto the locking pin as aforesaid and in order to facilitate this the side wall 9 may as aforesaid be divided by one or more cross saw-cuts.

It will be evident that my invention is not confined to any particular section of locking pin; the round section pin shown in my drawings will answer well in practice but if desired other sections may advantageously be used. Moreover if desired for additional strength the lock nut can be secured by two or more of the said locking pins similarly as above described with reference to securing the nut by a single locking pin.

What I claim as my invention and desire to secure by Letters Patent is:—

1. A lock nut having a walled groove or grooves in its top face approximately tangential to but slightly intersecting the screw thread of the nut, the outer side wall of said groove or grooves being adapted to be bent inwardly to secure a locking pin within the groove and in interlocking engagement with a groove in the bolt.

2. The combination with a screw threaded bolt of a lock nut thereon having a walled groove or grooves in its top face approximately tangential to but slightly intersecting the screw thread of the nut, a groove formed in one side of the bolt corresponding with the groove in the nut, and a locking pin located in said groove of the nut and in the side groove of the bolt and there retained by the outer side wall of the groove being bent inwardly on to the locking pin.

3. A lock nut having a walled groove or grooves in its top face approximately tangential to but slightly intersecting the screw thread of the nut, the outer side wall of said groove or grooves being formed with a saw cut parallel with the groove so that the said wall can be bent inwardly to secure a locking pin within the groove and in interlocking engagement with the groove in the bolt.

4. A lock nut having two walled grooves in its top face approximately tangential to but slightly intersecting the screw thread of the nut and arranged parallel to one another at opposite sides of the hole in the nut, the outer side wall of each of said grooves being adapted to be bent inwardly to secure a locking pin within the groove and in interlocking engagement with the groove in the bolt, one of said grooves being shallower than the other groove by a distance equal to half the pitch of the thread in the nut.

In testimony whereof I affix my signature in presence of two witnesses:

HUBERT DOLLMAN.

Witnesses:
ERNEST HARKER,
CHARLES BOSWORTH KETLEY.

Copies of this patent may be obtained for five cents each, by addressing the "Commissioner of Patents, Washington, D. C."